United States Patent [19]
Tsia et al.

[11] Patent Number: 5,264,970
[45] Date of Patent: Nov. 23, 1993

[54] DIGITAL SIGNAL REPRODUCING APPARATUS

[75] Inventors: Jang-Zern Tsia, Ma Dow Town; Jyu Yuan, Taipei, both of Taiwan

[73] Assignee: Industrial Technology Research Institute, Taiwan

[21] Appl. No.: 719,171

[22] Filed: Jun. 21, 1991

[51] Int. Cl.$^5$ ................................................. G11B 5/09
[52] U.S. Cl. ........................................ 360/53; 360/32; 360/51
[58] Field of Search .................. 360/53, 77.14, 51, 48, 360/40, 32, 64, 38.1, 72.2; 371/49.1; 358/336

[56] References Cited

U.S. PATENT DOCUMENTS

| | | | |
|---|---|---|---|
| 4,819,090 | 4/1989 | Hikawa | 360/32 |
| 4,841,390 | 7/1989 | Yokosawa | 360/77.14 |
| 4,862,297 | 8/1989 | Fukami et al. | 360/53 |
| 5,134,529 | 7/1992 | Inazawa et al. | 360/48 |

FOREIGN PATENT DOCUMENTS 59-231713 10/1983 Japan.

OTHER PUBLICATIONS

"DAT Cassette System, Part 1: Dimensions and Characteristics (Revised Version)," pp. 17-57, *The DAT Conference*, Mar. 1988.

*Primary Examiner*—Robert J. Pascal
*Assistant Examiner*—Ali Neyzari
*Attorney, Agent, or Firm*—Meltzer, Lippe, Goldstein

[57] ABSTRACT

A digital signal reproducing apparatus includes an address continuity check circuit, in addition to a parity check circuit, to check the validity of a reproduced block address. The address continuity check circuit checks the address continuity of n consecutively reproduced data blocks. In accordance with the present invention, a reproduced block address will be accepted as a correct block address only when it passes a parity check and a continuity check. Thus, the possibility of failing to detect an incorrect block address is greatly decreased.

7 Claims, 11 Drawing Sheets

SUB ID CODE

| W1 | | | | W2 | | | | |
|---|---|---|---|---|---|---|---|---|
| B7 | B6 | B5 | B4 | B3 | B2 | B1 | B0 | |
| CONTROL ID | | | | DATA ID | | | | |
| PROGRAM NUMBER ID 2 | | | | PROGRAM NUMBER ID 3 | | | | 136 |
| 1 | | | | PACK ID | | | | |
| 1 | | | | PROGRAM NO. ID 1 | X | X | X | 137 |

Table structure:

| W1 | | | | W2 | | | | |
|---|---|---|---|---|---|---|---|---|
| B7 | B6 | B5 | B4 | B3 | B2 | B1 | B0 | |
| CONTROL ID | | | | DATA ID | | | | 136 |
| PROGRAM NUMBER ID 2 | | | | PROGRAM NUMBER ID 3 | | | | |
| 1 | X | X | X | PACK ID | | | | |
| 1 | X | X | X | PROGRAM NO. ID 1 | X | X | 0 | 137 |
| | | | | | | | 1 | |

FIG. 3b (PRIOR ART)

PCM ID CODE

| | W1 | | | | W2 (BLOCK ADDRESS) | | | | | | | |
|---|---|---|---|---|---|---|---|---|---|---|---|---|
| | B7 | B6 | B5 | B4 | B3 | B2 | B1 | B0 | B7 | B6 | B5 | B4 | B3 | B2 | B1 | B0 |
| SC1 | FORMAT ID | ID1 | FRAME ADDRESS | 0 | X | X | X | 0 | 0 | 0 | 0 |
| | ID2 | ID3 | FRAME ADDRESS | 0 | X | X | X | 0 | 0 | 0 | 1 |
| SC2 | ID3 | FRAME ADDRESS | 0 | X | X | X | 0 | 0 | 1 | 0 |
| | ID4 | ID5 | FRAME ADDRESS | 0 | X | X | X | 0 | 0 | 1 | 1 |
| SC3 | ID5 | FRAME ADDRESS | 0 | X | X | X | 0 | 1 | 0 | 0 |
| | ID6 | ID7 | FRAME ADDRESS | 0 | X | X | X | 0 | 1 | 0 | 1 |
| SC4 | ID7 | FRAME ADDRESS | 0 | X | X | X | 0 | 1 | 1 | 0 |
| | | | FRAME ADDRESS | 0 | X | X | X | 0 | 1 | 1 | 1 |
| AC1 | FORMAT ID | ID1 | FRAME ADDRESS | 0 | X | X | X | 1 | 0 | 0 | 0 |
| | ID2 | ID3 | FRAME ADDRESS | 0 | X | X | X | 1 | 0 | 0 | 1 |
| AC2 | ID3 | FRAME ADDRESS | 0 | X | X | X | 1 | 0 | 1 | 0 |
| | ID4 | ID5 | FRAME ADDRESS | 0 | X | X | X | 1 | 0 | 1 | 1 |
| AC3 | ID5 | FRAME ADDRESS | 0 | X | X | X | 1 | 1 | 0 | 0 |
| | ID6 | ID7 | FRAME ADDRESS | 0 | X | X | X | 1 | 1 | 0 | 1 |
| AC4 | ID7 | FRAME ADDRESS | 0. | X | X | X | 1 | 1 | 1 | 0 |
| | | | FRAME ADDRESS | 0 | X | X | X | 1 | 1 | 1 | 1 |

DIGITAL SIGNAL REPRODUCING APPARATUS

FIELD OF THE INVENTION

The present invention generally relates to a digital signal reproducing apparatus, and in particular to an apparatus for reproducing a digital signal from a recording medium in which the digital signal is recorded in sequences of blocks and each block contains a block address indicating the order of reproducing.

DESCRIPTION OF PRIOR ART

Generally a digital signal recording/reproducing apparatus uses, for example, read/write heads to record a digital signal on a recording medium and to reproduce the recorded digital signal from the recording medium. The digital signal to be recorded may come from different sources or serve different purposes. The digital signal is usually recorded on tracks defined on the recording medium. According to the sources and purposes of a digital signal, a track is usually divided into a plurality of areas.

The rotary-head type digital audio tape recorder (hereafter referred to as R-DAT) is a practical example of the aforementioned digital signal recording/reproducing apparatus. The general format of the R-DAT system is described in "The DAT Conference Standard", published in March 1988 by The DAT Conference. U S. Pat. No. 4,841,390 and Japan Patent document 59-231713 also describe R-DAT systems.

Figure 1:
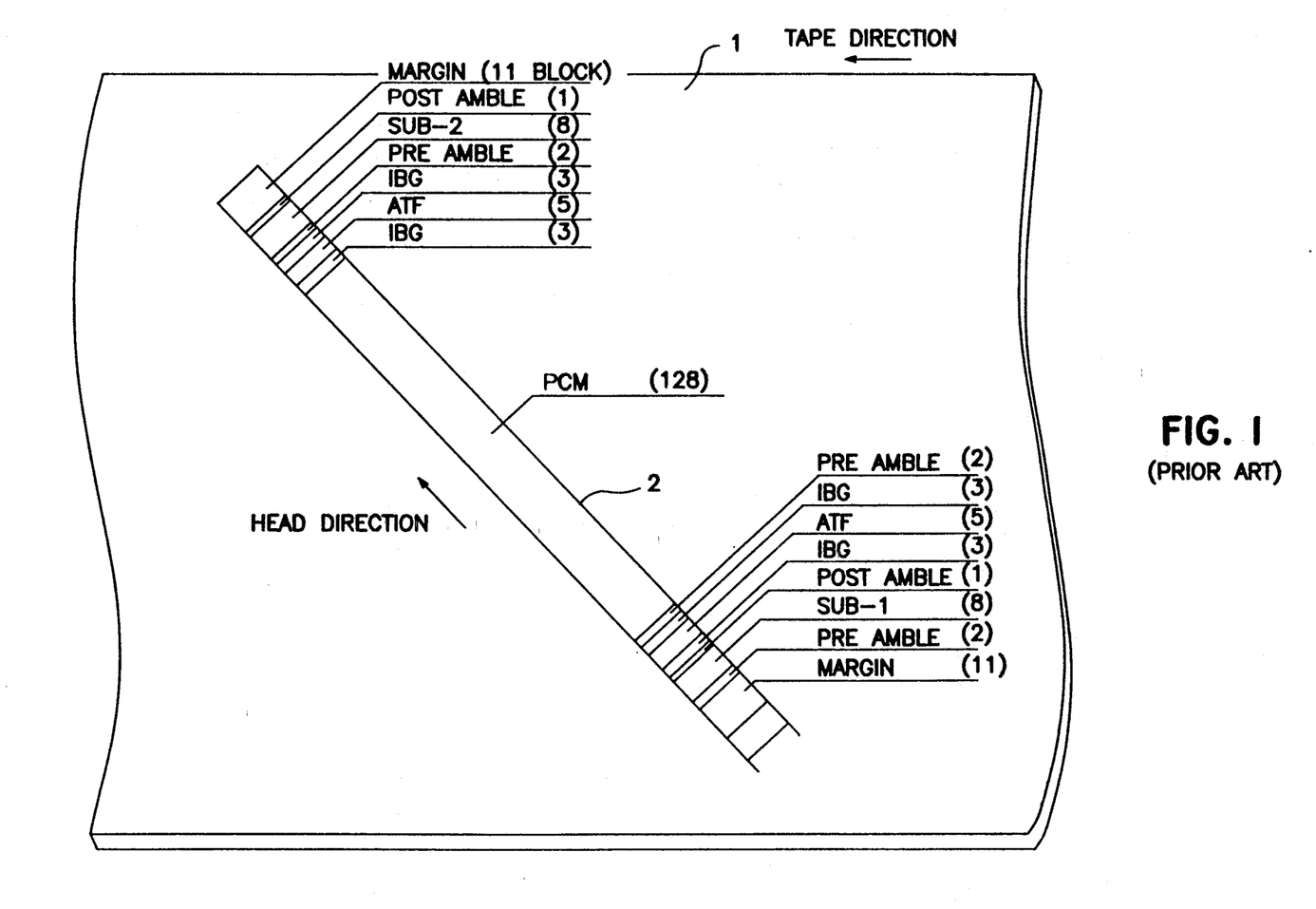
FIG. 1 shows the format of a track of a digital audio tape.

In an R-DAT, rotary magnetic heads are used to record digital signal on and to reproduce a digital signal from a magnetic tape. The digital signal is recorded on tracks defined on the magnetic tape. The tracks on the magnetic tape are formed obliquely to the longitudinal direction of the magnetic tape. The tracks are formed alternately by a pair of rotary magnetic heads, namely the A head and the B head, of different azimuth angles. FIG. 1 shows the track format of an R-DAT. In particular, in FIG. 1, a track 2 is shown on a tape 1 which moves in the direction of the arrow. The track 2 mainly comprises PCM area, SUB data areas (SUB-1 area and SUB-2 area) and ATF (Automatic Track Finding) areas. The PCM area and the SUB data areas contain digital audio signals and PACK data, respectively; and the ATF area contains signals of various frequencies to enable tracking servo control during playback operation. Other areas include inter-block gap (IBG) and amble areas such as preamble and postample.

Figure 2:
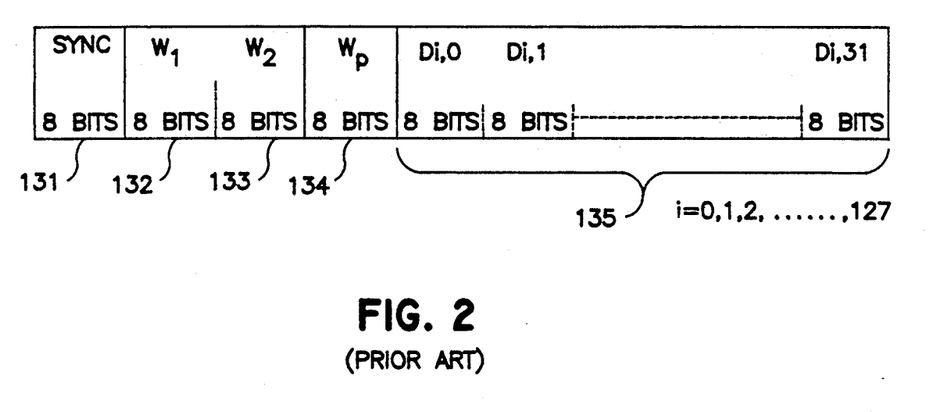
FIG. 2 shows the format of a block located in the track of FIG. 1.
Figure 2:
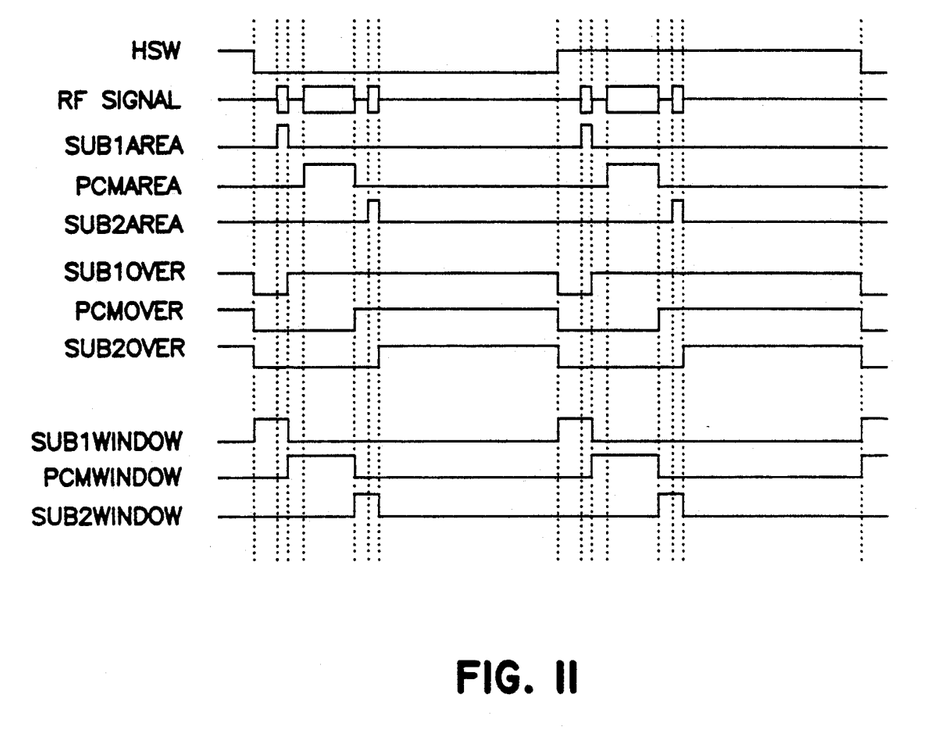

The digital signal in the SUB data areas and the PCM area is further divided into blocks. There are 8 blocks in the SUB-1 area and the SUB-2 area, respectively, and 128 blocks in the PCM area. The block format is shown in FIG. 2. Either a SUB data block or a PCM block comprises a synchronization (SYNC) signal 131, ID Code W1 132, ID code W2 133, ID parity Wp 134, and 32 bytes of data $D_{i,j}$ 135, where i represents the block address and j=0,1, ... 32. The SYNC signal 131 is to indicate the beginning of a reproduced block and the ID parity Wp 134 provides an error detection function associated with ID codes W1 132 and W2 133 through a simple bit-wise exclusive-OR logic, i.e., Wp=W1+W2 (hereafter referred to as a parity check) during playback operation. The data 135 is the PCM coded audio data for a PCM block and is the PACK data for a SUB block.

Figure 3A:
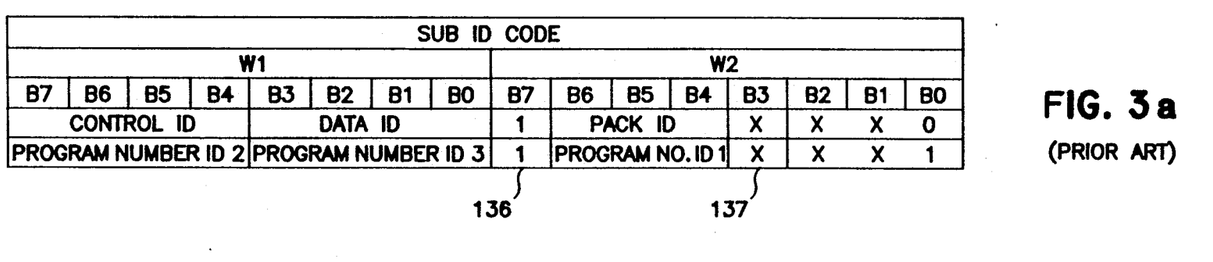
FIG. 3(a) and FIG. 3(b) show the contents of ID and parity codes for a block such as the block of FIG. 2.
Figure 3B:
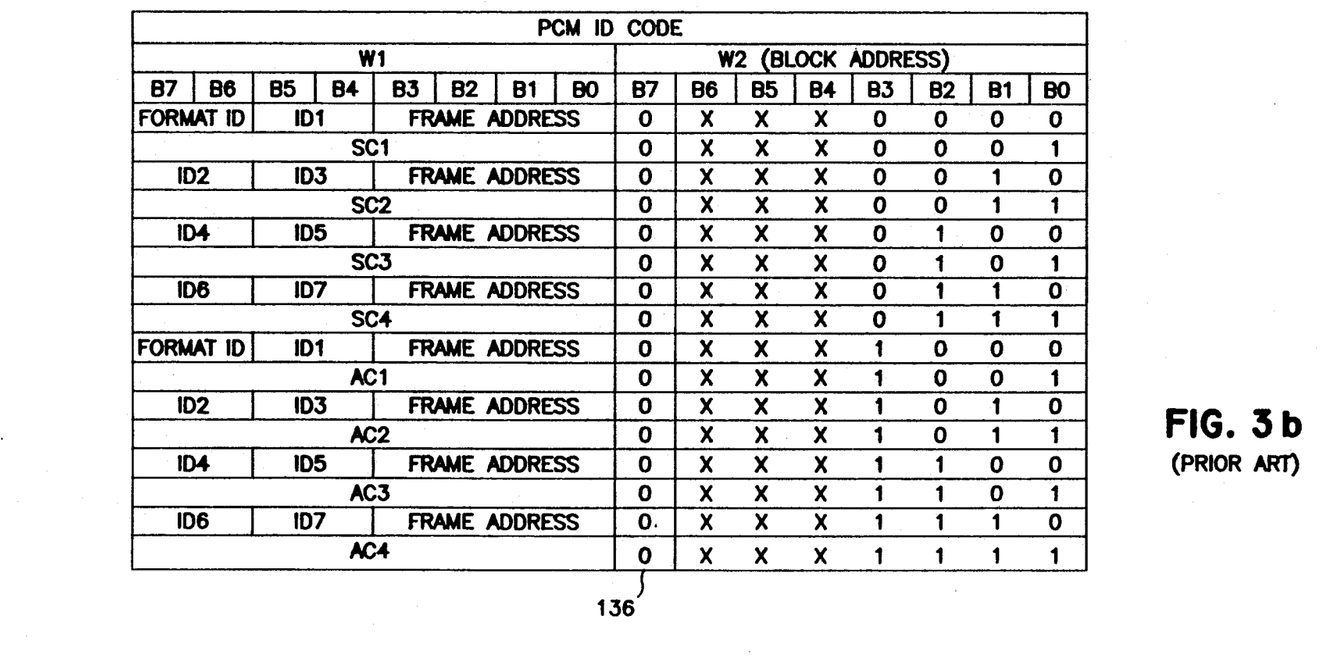

The contents of ID codes W1 and W2 are shown in FIG. 3(a) for a SUB block and in FIG. 3(b) for a PCM block. The ID code W2 of each block includes the block address of this block. The block address is contained in the four least significant bits of W2 for a SUB block and is contained in the seven least significant bits of W2 for a PCM block. The block address starts from zero for the SUB-1 area and the PCM area, and eight for the SUB-2 area, and is increased by one every one block. The most significant bit 136 of the ID code W2 can be used to distinguish between SUB blocks and PCM blocks when a block is reproduced and the fourth least significant bit 137 of ID code W2 of a SUB block can be used to distinguish between SUB-1 blocks and SUB-2 blocks.

When an R-DAT operates in recording mode, an input analog audio signal is converted into PCM data and PACK data is received from the system control CPU. Prior to being sent to the recording head, the PCM data and PACK data are subjected to interleaving, ECC (error control coding) encoding and 8-to-10 modulation. The ECC encoding performed on PACK data is a Reed-Solomon code C1:(32,28,5) with an interleaving depth of two symbols. The ECC encoding performed on PCM data is a doubly-encoded Reed-Solomon code, including C1 with an interleaving depth of two symbols and C2:(32,26,7) with an interleaving depth of four blocks. A two-track-completed interleaving is also performed on the PCM data before the ECC encoding. Thus during playback, 10-to-8 demodulation, ECC decoding and de-interleaving must be performed on the reproduced digital signal before the final PCM data and PACK data are sent out of this apparatus.

Figure 4:
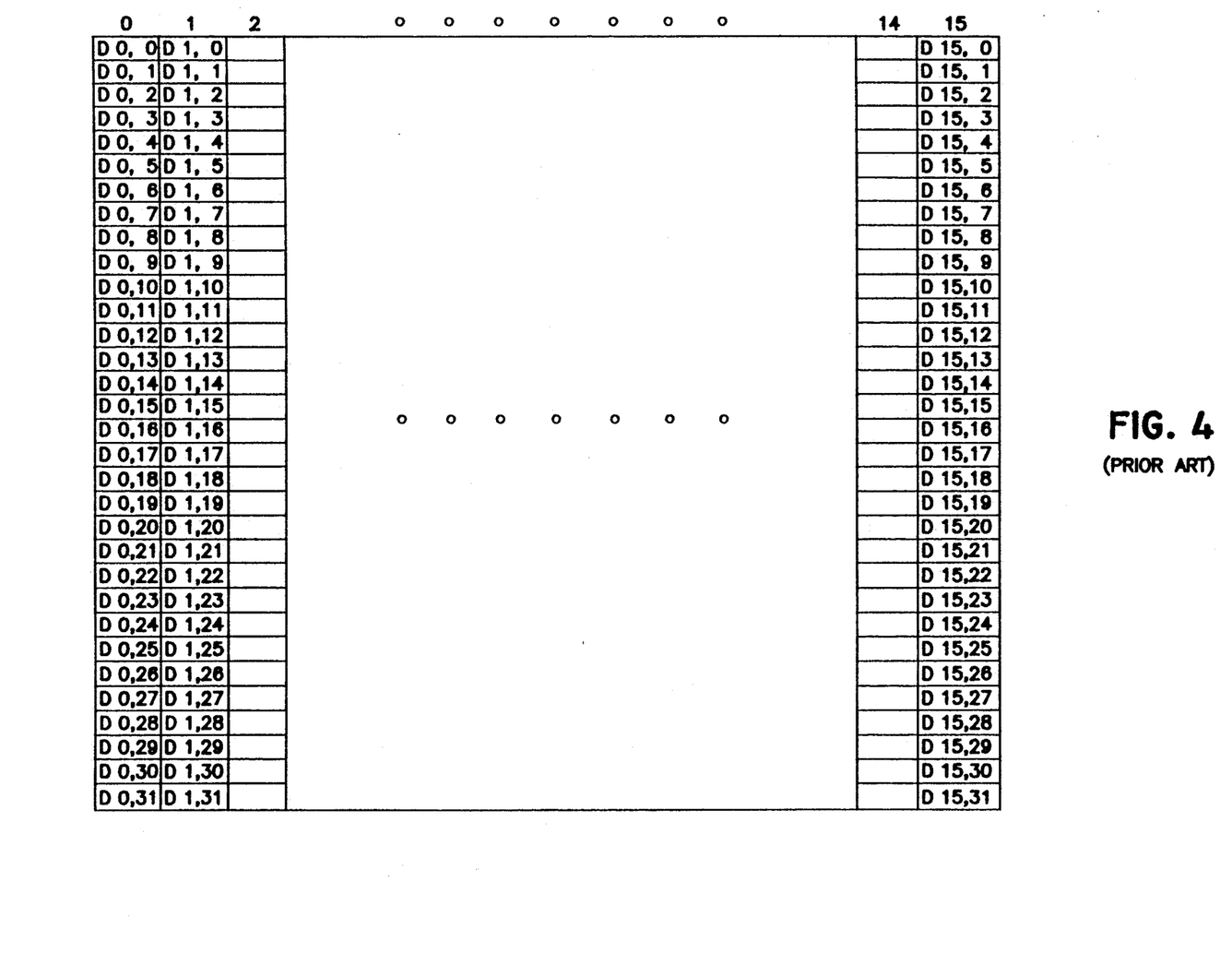
FIG. 4 and FIG. 5 show the organization of a RAM for storing reproduced digital data.
Figure 5:
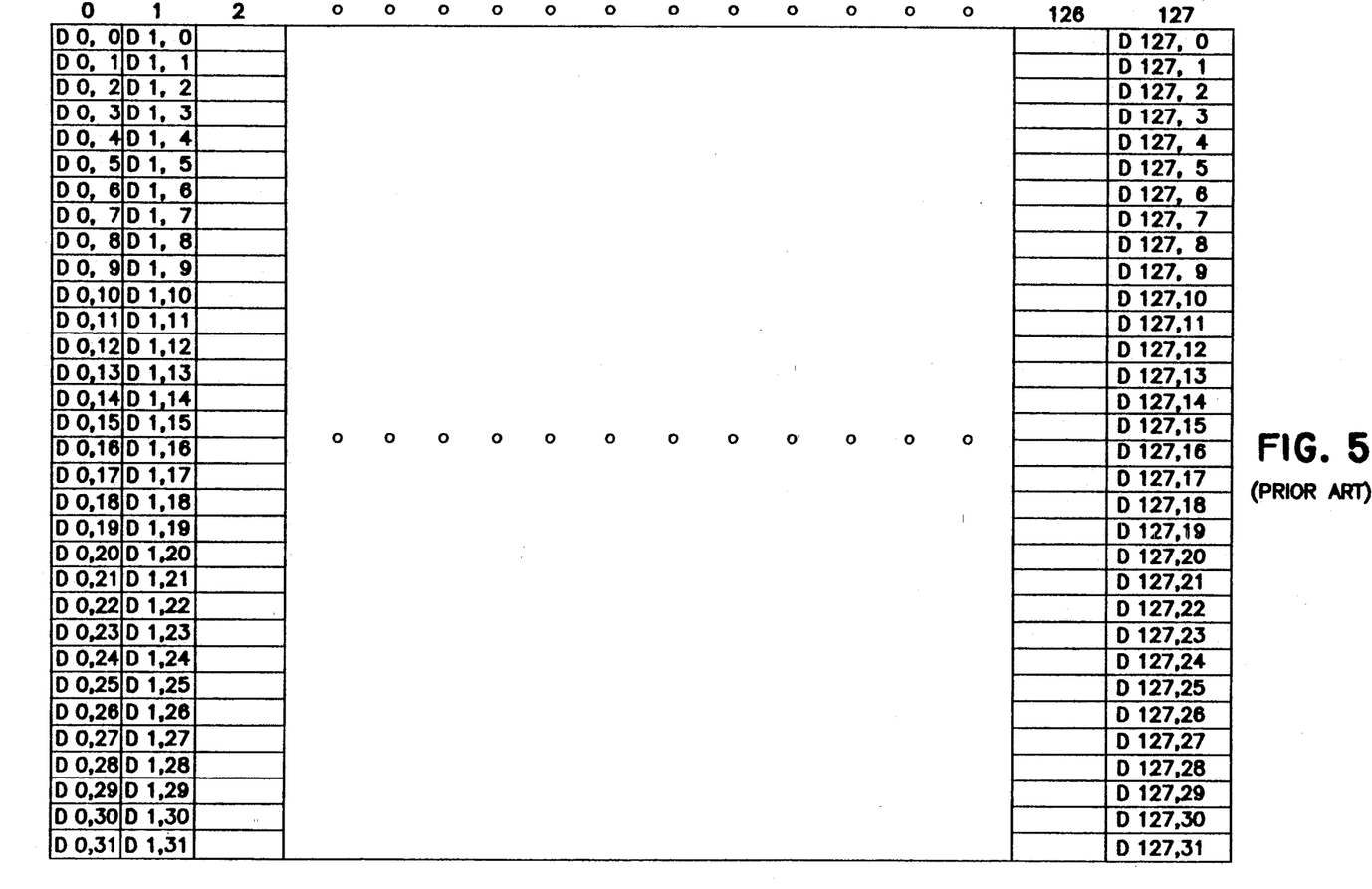

To facilitate the ECC decoding and de-interleaving, when the digital signal has been demodulated, the demodulated data must be temporarily stored in a buffer RAM waiting for the ECC decoding and de-interleaving to be performed. As shown in FIG. 4 and FIG. 5, the data allocation of the reproduced data in the buffer RAM is controlled according to the block address as contained in the reproduced data.

The reproduced digital signal is subject to errors due to various causes. Errors that contaminate the data words 135 of a block as shown in FIG. 2 can possibly be corrected by the ECC decoder if the number of errors is within the error correction capability of ECC codes, or the effect on the output analog audio signal can be alleviated by a smoothing operation such as interpolation or holding the previous sample if the errors in PCM data fail to be corrected by the ECC decoder. On the other hand, errors that contaminate the SYNC signal 131, the ID codes W1 132, W2 133 or ID parity Wp 134 as shown in FIG. 2 cause serious problems because the correct reproduction of the data words 135 of a block depends strongly on the correct reproducing of the SYNC signal 131 and the block address contained in ID code W2 133.

When reproducing a data block, if the parity check operation performed on ID code WI 132, W2 133 and the ID parity Wp 134 detects an error, the reproduced block address is unreliable. In this case, the subsequently reproduced data words 135 in FIG. 2 are not written to buffer RAM; thus the location of this block in the buffer RAM contains erroneous data. There are cases in which errors in the ID codes W1 132, W2 133 and ID parity Wp 134 fail to be detected by parity check. Suppose this undetection of errors occurs when reproducing a block with a block address i and the block address is erroneously reproduced as j, then the reproduced data words 135 of block i will be written into the location of the block j in the buffer RAM. While the location of block i in the buffer RAM remains unchanged. If j>i, only the location of block i contains erroneous data because the location of block j will be updated when block j is reproduced later. On the other hand, if j<i, it means that the correct data in the location of block j in buffer RAM is replaced by erroneous data, so both the location of block i and block j contain erroneous data.

Due to error contamination, it is possible for a spurious SYNC signal to occur anywhere in data reproduced from a track in the recording medium. Normally a spurious synchronizing signal will be recognized because the subsequent three reproduced words will not pass the parity check. Nevertheless, it is still possible that the subsequent three reproduced words pass the parity check and the spurious synchronizing signal is thus improperly recognized as a beginning of a data block (hereafter referred to as a spurious block). The data words 135 (see FIG. 2) of a spurious block inside the data areas, namely SUB-1 area, SUB-2 area and PCM area in the case of R-DAT, will be written into buffer RAM. This action will replace a block of correct data in the buffer RAM with erroneous data if the data area corresponding to the spurious block has been previously reproduced. On the other hand, if the corresponding data area has not yet been reproduced, the data of a spurious block in the buffer RAM will eventually be updated with data words of a correct block when the data area of the correct block is reproduced later. When an improperly recognized spurious synchronizing signal occurs in data word region 135 in FIG. 2 of a reproduced data block, the data location of the reproduced block in the buffer RAM will be left unwritten and the data words following the spurious synchronizing signal will be written into the data location of the block corresponding to the spurious block address. Whether the spurious data in buffer RAM will be updated with correct data or it replaces correct data already written in buffer RAM depends on whether or not the spurious block address is greater than the block address of the reproduced data block.

OBJECT AND SUMMARY OF THE INVENTION

A general object of the present invention is to provide a digital signal reproducing apparatus in which deterioration of the output data due to errors in the block synchronization signal and the block address in a reproduced digital signal can be minimized.

Another object of the present invention is to provide a digital signal reproducing apparatus in which, when an incorrect block address in the reproduced digital signal is not detected by a parity check circuit, there is still another circuit in the apparatus to detect this incorrect block address.

A further object of the present invention is to provide a digital signal reproducing apparatus in which when an incorrect block address in the reproduced digital signal is detected a correct block address can be interpolated.

Still another object of the present invention is to provide a digital signal reproducing apparatus in which whenever a spurious synchronizing signal occurs in the reproduced digital signal, and even if the parity check associated with this spurious synchronizing signal is received, recognition of the spurious synchronizing signal as a proper synchronizing signal is prevented.

In accordance with the present invention, to attain the above objects, there is provided an address continuity check circuit, in addition to the parity check circuit, to check the validity of a reproduced block address and the propriety of a reproduced synchronizing signal. The address continuity check circuit checks the block address continuity of n consecutively reproduced data blocks, where n is an integer greater than one. In accordance with the present invention, a reproduced block address will be accepted as a correct block address only when it passes the parity check and the continuity check. Thus the possibility of failing to detect an incorrect block address is greatly reduced. For the correction of an incorrect block address, a block address counter is provided; the operation of the block address counter is controlled by the results of the parity check and the address continuity check, and is thus highly reliable. Also there is provided an area separating circuit which generates for each data area in a recording track an area signal which is a window signal to prevent spurious blocks from occurring outside the reproduced data area.

BRIEF DESCRIPTION OF THE DRAWINGS

FIG. 11 illustrates the timing of the signals utilized in the area separator circuit of FIG. 10.

DESCRIPTION OF THE PREFERRED EMBODIMENTS

A preferred embodiment of the present invention will now be described by referring to FIG. 6.

Figure 6:
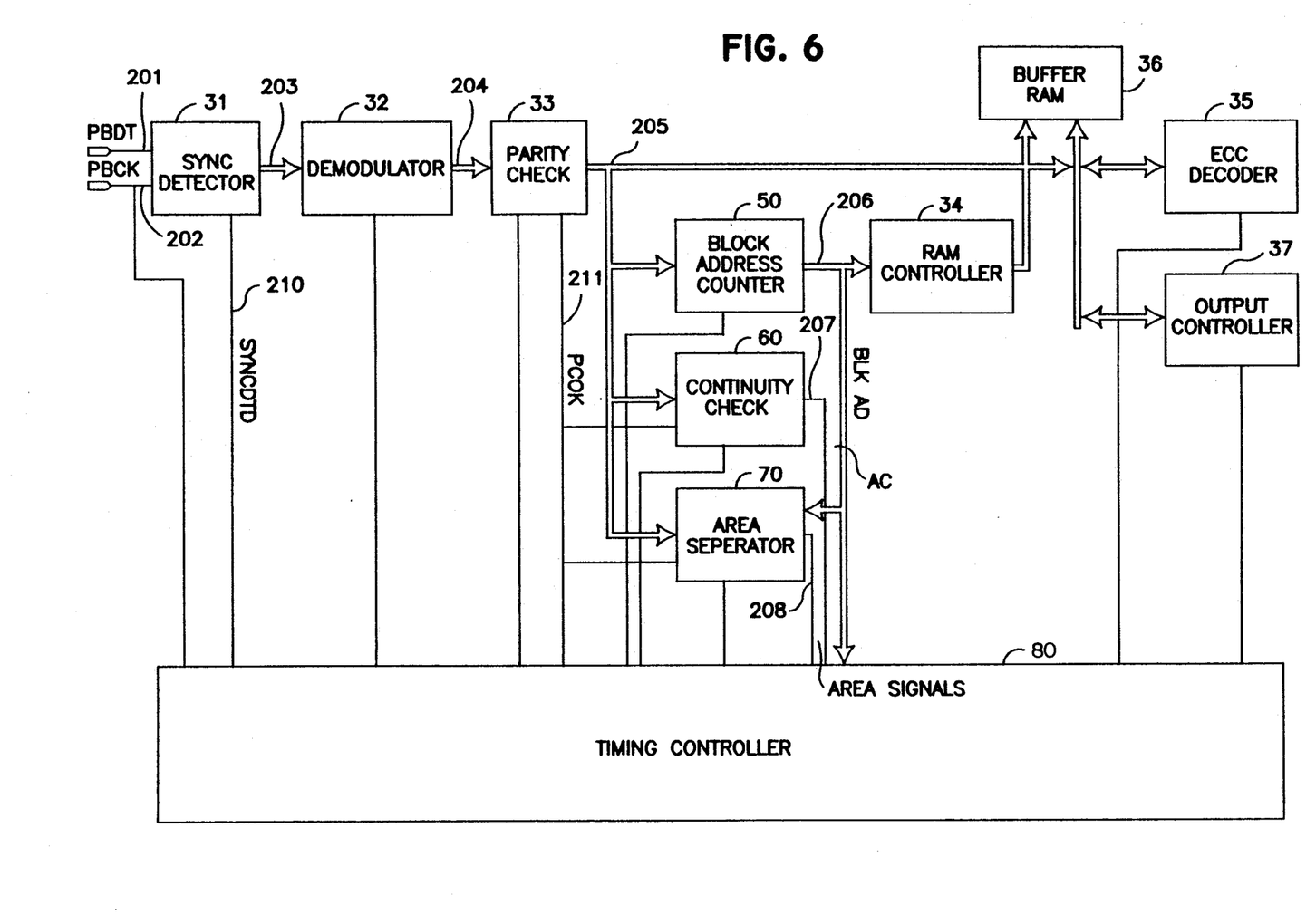
FIG. 6 is a block diagram of a digital signal reproducing apparatus according to an illustrative embodiment of the present invention.

In FIG. 6, PBDT 201 is the digital signal reproduced from a recording medium, for example, a magnetic tape, by using a magnetic head to scan along the recording tracks and then amplifying and equalizing the head output signal; PBCK 202 is the clock signal extracted from the digital signal PBDT 201 by a phase locked loop (not shown). A synchronization signal detecting circuit 31 keeps monitoring the digital signal PBDT 201. When a synchronization signal is detected, a pulse is generated to form the signal SYNCDTD 210. Subsequently, the timing controller 80 controls the operation of the demodulator 32 and the parity check circuit 33 in such a manner that the signal is demodulated and the parity of the ID code words associated with the detected synchronization signal is checked. The output of the parity check circuit 33 is the signal PCOK 211.

PCOK 211 asserts the "1" state if the parity check is passed; otherwise, it asserts the "0" state.

Normally, in digital recording, the block addresses of two continuously recorded data blocks in a recording track are continuous. Advantage can be taken of this recording format to further increase the reliability of the correctness check of the block address of a reproduced block if an address continuity check is performed. The function of the continuity check circuit 60 is to reveal the continuity of the block addresses of n successively reproduced data blocks, where n is an integer and may be taken as having a value greater than one. When data is being reproduced, if the block addresses of a block and its preceding (n−1) blocks are continuous, then the signal AC 207 asserts the "1" state; otherwise it asserts the "0" state.

Figure 7:
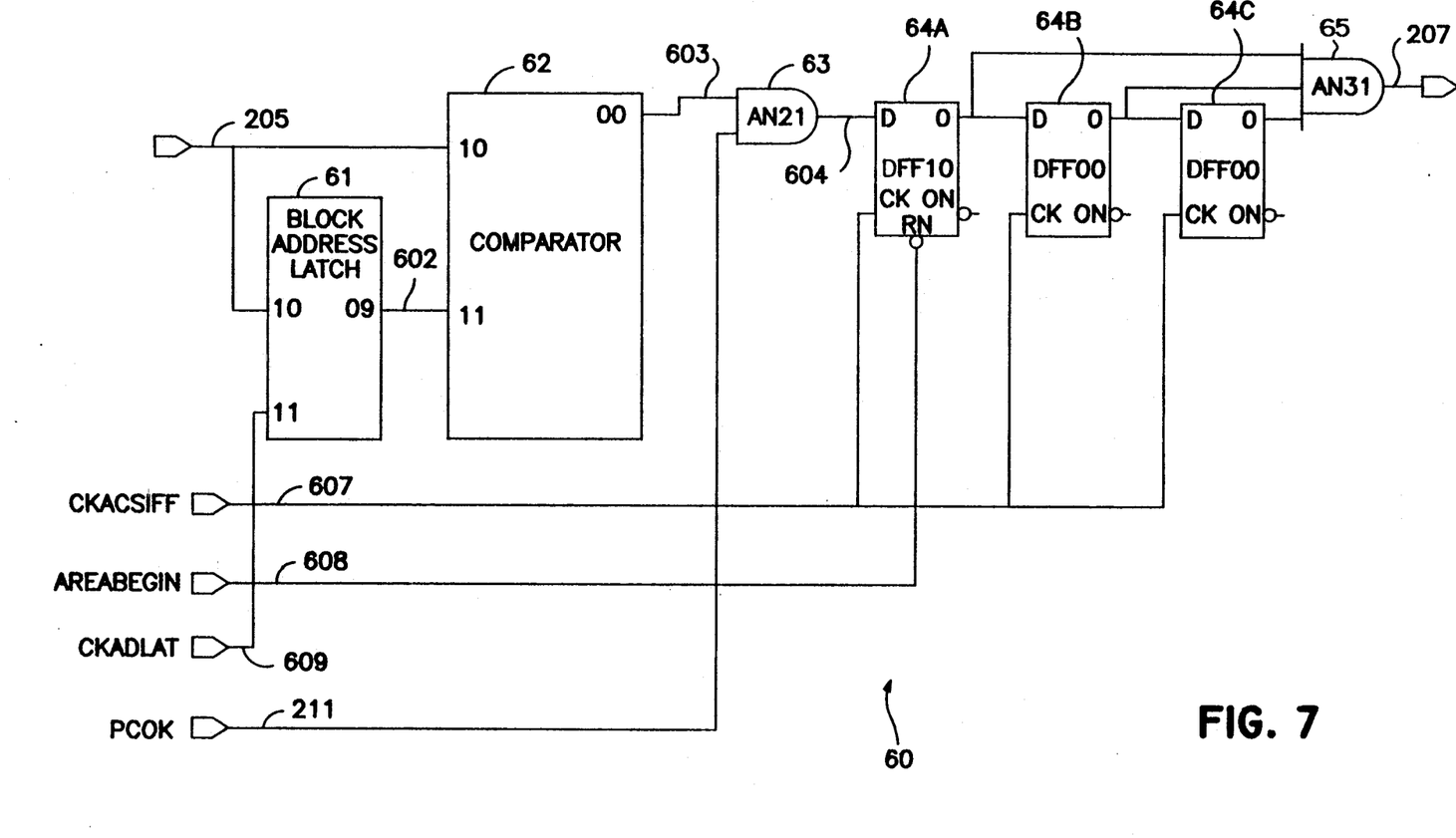
FIG. 7 is a circuit diagram of an address continuity check circuit for use in the apparatus of FIG. 6.

An embodiment of the continuity check circuit 60 in FIG. 6 is detailed in FIG. 7, in which the aforementioned integer n is 4. The signal bus 205 in FIG. 7 carries the output data stream of the parity check 33 in FIG. 6; the signal 602 latched by the block address latch 61 carries the block address of the preceding block when the block address continuity check is being performed on a reproduced block. The output signal 603 of the comparator 62 asserts the "1" state if the value on the bus 205 equals one plus the value on the bus 602; otherwise it asserts the "0" state. Thus when the block address of the block being reproduced appears on the bus 205, the output signal 603 of the comparator 62 represents the address continuity of this reproduced block and its preceding block. The AND gate 63 performs the logic AND operation on the signal 603 and PCOK 211. The effect of this operation is that the address continuity is recognized only if the correctness of the reproduced block addresses has been proved by parity check. A positive edge of the signal CKACSIFT 607 occurs at this time to shift the latched signal of the D-type latches 64A and 64B one stage forward and to latch the output signal 604 of the AND gate 63 into the latch 64A. The signals latched at the D-type latches 64B and 64C are the results of the two-block continuity check performed when reproducing the first and the second preceding blocks, respectively, of the current block being reproduced. By performing a logic AND operation on the latched signals of the latches 64A, 64B and 64C, the output signal AC 207 of the continuity check circuit 60 is then generated. After the output signal 604 of the AND gate 63 is latched into the latch 64A and while the block address of the block being reproduced still remains on the bus 205, a positive edge of the signal CKADLAT 609 occurs to latch the block address on the bus 205 into the block address latch 61 for use the next time the two-block continuity check is performed. A pulse of the signal 608 occurs to clear the latch 64A every time when the reproducing of a data area starts.

Figure 8:
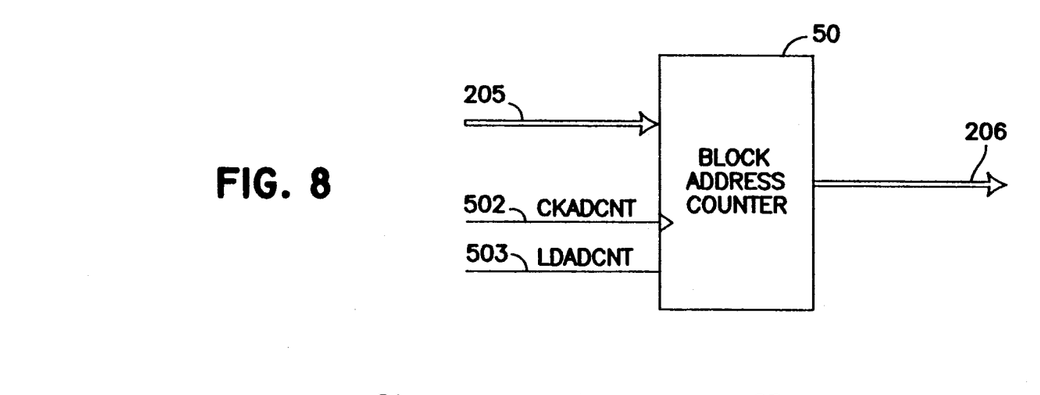
FIG. 8 schematically illustrates a block address counter for use in the apparatus of FIG. 6.

FIG. 8 schematically illustrates the block address counter 50 included in the apparatus shown in FIG. 6. The block address counter 50 is a binary counter with sufficient number of bits to accommodate the value of the reproduced block address and one plus the reproduced block address. A positive edge on the signal line CKADCNT 502 will trigger the output of the block address counter 50 to increase by one and a pulse on the signal LDADCNT 503 will load the value on the input bus 205 to the output bus 206. The signals CKADCNT 502 and LDADCNT 503 are generated by the timing controller 80 shown in FIG. 6.

Figure 9:
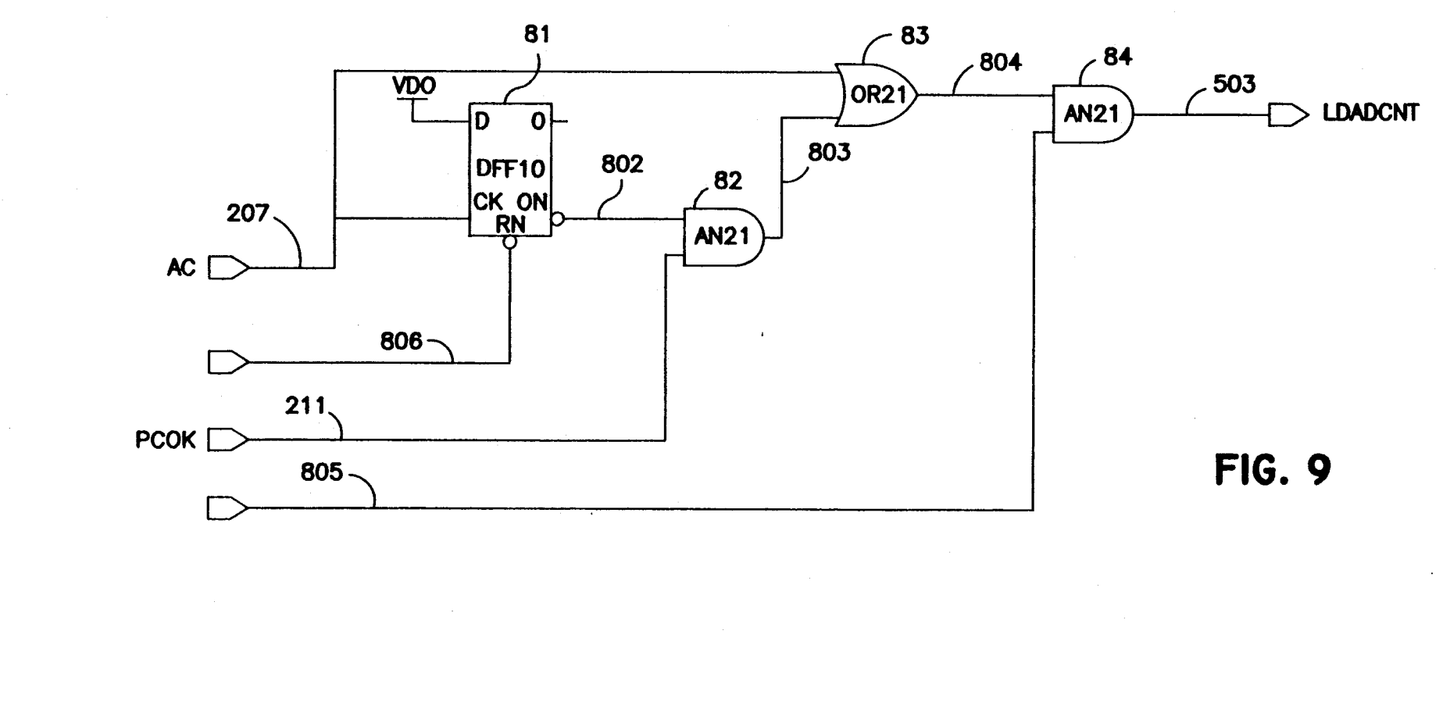
FIG. 9 illustrates part of the timing control circuitry of the apparatus of FIG. 6.

An implementation of the circuit for the generation of the signal LDADCNT 503 is shown in FIG. 9. When the reproducing of a data area starts, the signal AC 207 is in the "0" state. There occurs a pulse in the signal line 806 to bring the QN output 802 of the D-type latch 81 to the "1" state, until the signal AC 207 turns to the "1" state to bring the QN output 802 to the "0" state. On the signal line 805 a pulse will be generated whenever the block address of a reproduced block arrives on the bus 205 (see FIG. 6). Through the logic operation of the gates 82, 83 and 84, a pulse resembling that of the signal 805 will occur on the signal line LDADCNT 503 when the signal PCOK 211 is in the "1" state if the signal AC 207 is still in the "0" state; while if the signal AC 207 turns to the "1" state, a pulse will occur only when the signal AC 207, in addition to the signal PCOK 211, is also in the "1" state. That is to say, when the reproducing of a data area starts and address continuity has not been detected, the reproduced block address that passes the parity check is loaded to the block address counter 50; while when address continuity has once been detected, only the reproduced block address that passes the continuity check will be loaded into the block address counter 50. Because the continuity check implies parity check, the block address loaded to the block address counter 50 according to the results of continuity check is more reliable than that loaded just according to the results of parity check. The signal CKADCNT 502 (all FIG. 8) is generated in such a manner that when reproducing a data block a pulse occurs on it before the pulse occurs on the signal 805 in FIG. 9 to increase the content of the block address counter 50 by one. So even if a correct block address is not reproduced for a data block, there is still a reliable predicted block address in the block address counter 50.

Figure 10:
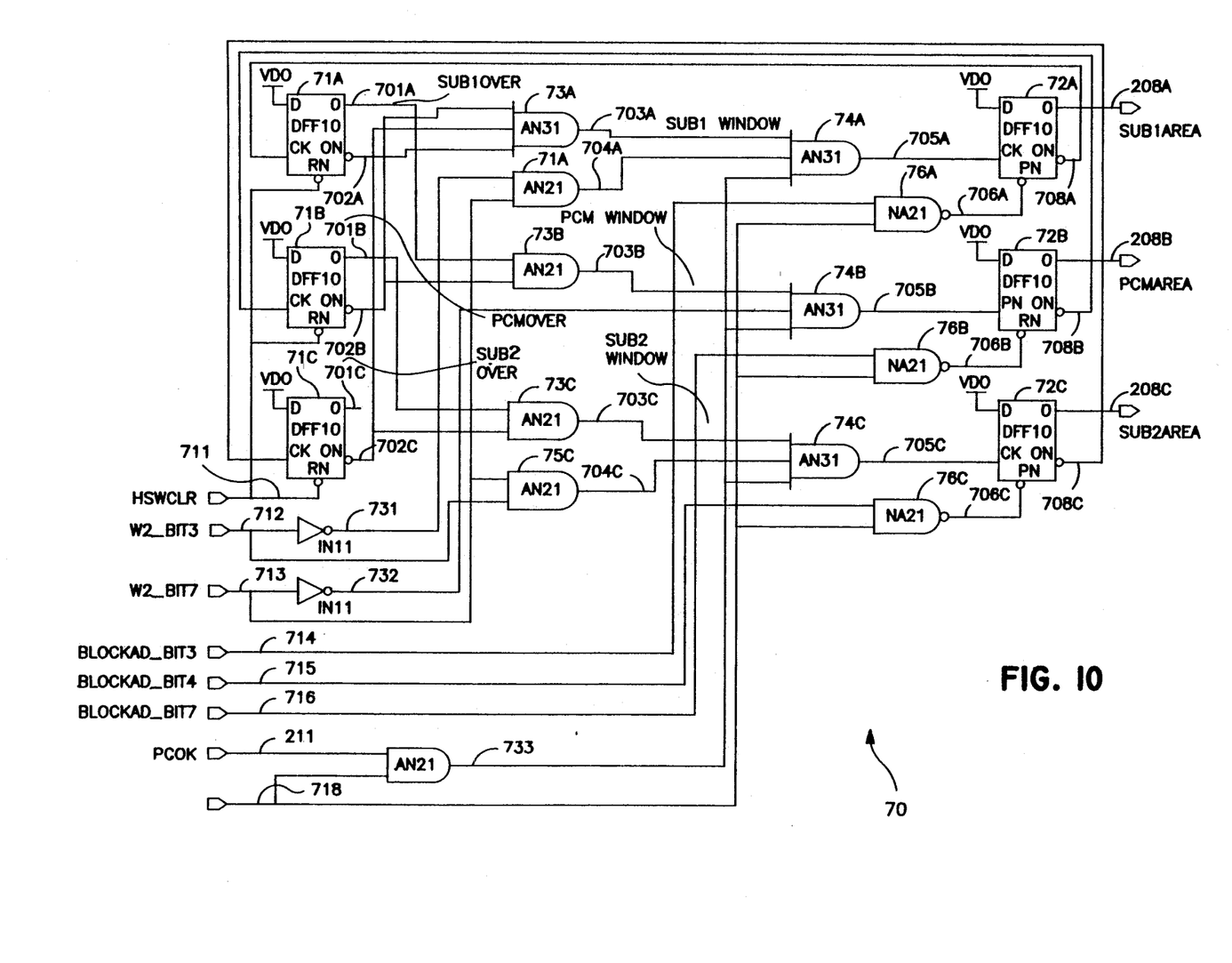
FIG. 10 illustrates an area separator circuit for use in the apparatus of FIG. 6.

The area separator circuit 70 in FIG. 6 is used to generate an area signal for each data area on a recording track. An area signal remains at the "1" state during the time the data area associated with it is being reproduced; otherwise it remains at the "0" state. For the application of reproducing digital signal from a magnetic tape with the R-DAT recording format, an implementation of the area separator circuit 70 is shown in FIG. 10 with the waveform of important signals in this circuit shown in FIG. 11. The data areas in a recording track on a R-DAT tape include the SUB-1 area, the SUB-2 area and the PCM area; the signals SUB1AREA 208A, PCMAREA 208B and SUB2AREA 208c in FIG. 10 are the area signals corresponding to the three data areas, respectively. The "1" state of the "over" signals SUB1OVER 701A, PCMOVER 701B and SUB-2OVER 701C indicates that the SUB-1 area, PCM area and SUB-2 area, respectively, have passed over in the reproducing of a track. The window signals SUB1-WINDOW 703A, PCMWINDOW 703B and SUB2-WINDOW 703C are generated by performing a logic operation on the signals SUB1OVER 701A, PCMOVER 701B and SUB2OVER 701C. An area signal is permitted to turn from the "0" state to the "1" state only when its corresponding window signal is at the "1" state. The signal 711 is used to bring the "over" signals latched in the D-type latches 71A, 71B and 71C to the "0" state when the reproducing of a track starts. An "over" signal turns to the "1" state at the time of when its corresponding area signal turns from the "1" state to the "0" state. The signals 712 and 713 carry the third and the seventh bit, respectively, of the ID code W2 133, as shown in FIG. 2 and FIG. 3, of a reproduced block; which are used to distinguish between the SUB-1 area, PCM area and SUB-2 area. A pulse will be generated on the signal line 718 at a proper time when a block is reproduced, and is used to control the timing within a block when updating the area signals. For the generation of the area signal corresponding to the PCM area, for example, when a correct block address, proved by parity check, is reproduced from the PCM area, the signal 713 should be at the "0" state and thus the signal 732 is at the "1" state; also the window signal PCMWINDOW 703B is at the "1" state. When a pulse occurs on the signal 718, a positive edge will be generated on the output signal line 705B of the AND gate 74B. The signal PCMAREA 208B is then brought to the "1" state. When the PCM area just ends, the signal 716, which is the seventh bit of the block address counter 50 becomes "1"; a pulse on the signal 718 will turn the outputs of the AND gate 76B to the "0" state, which then brings the signal PCMAREA to the "0" state. According to this invention, the signals 714, 715 and 716, which are supplied from the block address counter 50, are used to control the negative edge of area signals. Since the correctness of the operation of the block address counter 50 is proved by parity check and address continuity check, the negative edge is highly reliable.

The buffer RAM 36 in FIG. 6 is used to store the reproduced data for a sufficient period of time in order so that the ECC decoder 35 can fetch the data and perform error correction. The size of the buffer RAM 36 depends on interleave depth of the error control codes used. The RAM controller 50 in FIG. 6 is used to generate the address signals and control the read/write operation of the buffer RAM 36. When the data reproduced from the recording medium is to be written to the buffer RAM 36, the address signal is generated by referring to the output of the block address counter 50. The output controller 37 reads the ECC decoded data from the buffer RAM 36 and sends the data out of the reproducing apparatus.

Figure 12:
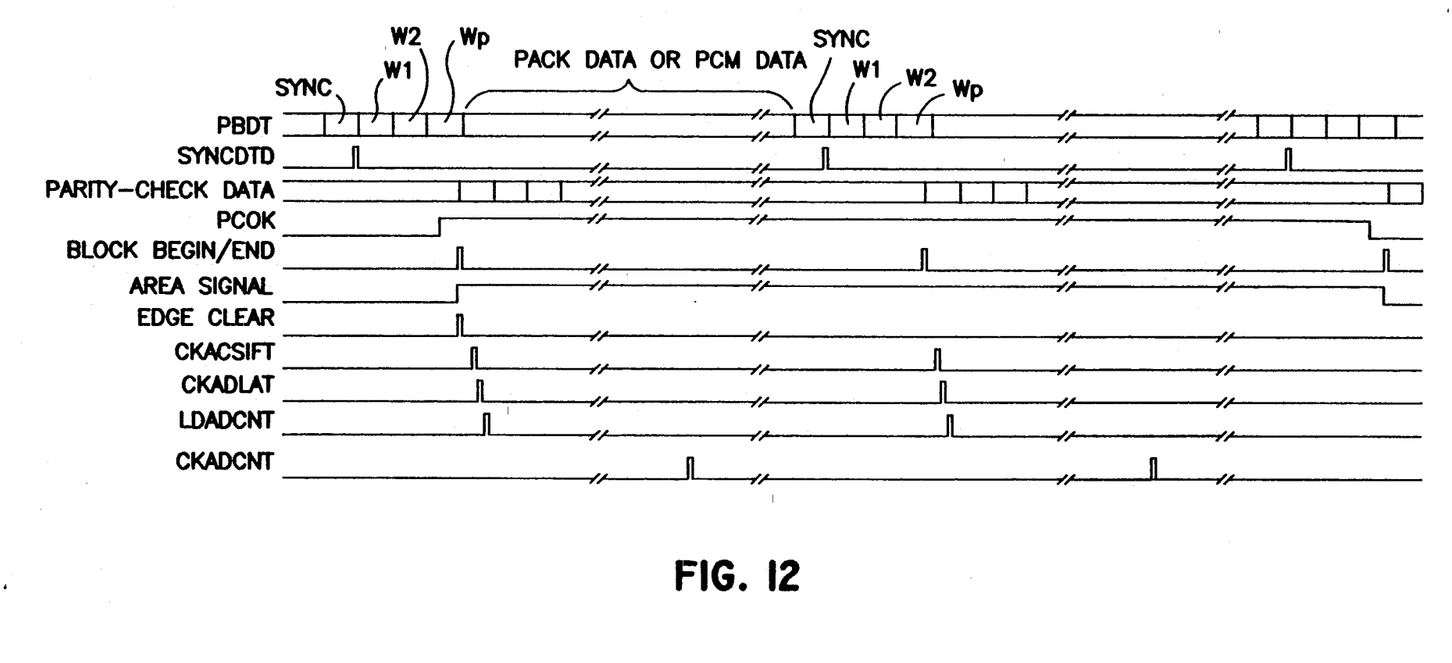
FIG. 12 illustrates the timing of the signals utilized in FIGS. 6, 7, 8, and 9.

FIG. 12 illustrates the timing of the waveform of the signals utilized in FIGS. 6, 7, 8, and 9.

Finally, the above-described embodiments of the invention are intended to be illustrative only. Numerous alternative embodiments may be devised by those skilled in the art without departing from the spirit and scope of the present invention.

We claim:

1. A digital signal reproducing apparatus for reproducing a digital signal which is recorded in a recording medium in sequences of blocks, said digital signal reproducing apparatus comprising a parity check circuit for checking the parity of an address of each of said blocks, an address continuity check circuit for sequentially receiving via said parity check means only addresses of blocks reproduced from said recording medium and checking an address continuity of a sequence of n consecutive, blocks recently reproduced from said recording medium, where n is an integer greater than one, said apparatus accepting an address of an $n^{th}$ recently reproduced block of said sequence of n consecutive, data blocks recently reproduced from said recording medium as correct only when the block address of said sequence of n blocks recently reproduced from said recording medium pass said parity check and said continuity check, a block address counter controlled by said parity check circuit and address continuity check circuit for correcting an incorrect address in one of said blocks, a buffer RAM for storing said reproduced blocks, and a RAM controller responsive to an output of said block address counter for generating RAM write addresses for writing said data blocks into said buffer RAM.

2. The digital signal reproducing apparatus of claim 1 wherein said recording medium is a magnetic tape and wherein said digital signal is recorded on tracks of said tape.

3. A digital signal reproducing apparatus for reproducing a digital signal which is recorded in a recording medium in sequences of blocks, said digital signal reproducing apparatus comprising a parity check circuit for checking the parity of an address of each of said blocks, an address continuity check circuit for checking an address continuity of a sequence of n consecutively reproduced data blocks, where n is an integer greater than one, said apparatus accepting an address of a reproduced block as correct only when it passes said parity check and said continuity check, a block address counter controlled by said parity check circuit and address continuity check circuit for correcting an incorrect address in one of said blocks, a buffer RAM for storing said reproduced blocks, and a RAM controller responsive to an output of said block address counter for generating RAM write addresses for writing said data blocks into said buffer RAM, wherein said recording medium is a magnetic tape, wherein said digital signal is recorded on tracks of said tape, and wherein said apparatus further comprises an area separator circuit for generating signals identifying different areas on said tracks.

4. The digital signal reproducing apparatus of claim 1 wherein said apparatus further comprises a decoder for performing error correction on said blocks stored in said buffer RAM.

5. The digital signal reproducing apparatus of claim 1 wherein said apparatus further comprises a synchronization detector for detecting a synchronization signal to indicate the beginning of a reproduced block.

6. In a digital signal reproducing apparatus for reproducing a digital signal which is recorded in a recording medium in sequences of blocks, a combination for detecting incorrect block addresses comprising parity check means for checking the parity of said block addresses and address continuity checking means for sequentially receiving via said parity check means only addresses of blocks reproduced from said recording medium and checking the address continuity of a sequence of n consecutive blocks recently reproduced from said recording medium and received via said parity check means, where n is an integer greater than 1, wherein an address of an $n^{th}$ recently reproduced block is accepted as correct by said apparatus only when the block addresses of said sequence of n blocks recently reproduced from said recording medium pass said parity check and said continuity check.

7. The apparatus of claim 6 wherein said apparatus includes means for correcting an address indicated as incorrect by said address continuity checking means.

* * * * *